United States Patent [19]

Bonaddio et al.

[11] 4,352,447
[45] Oct. 5, 1982

[54] METHOD OF AND APPARATUS FOR SIDEWARD DISPLACEMENT OF SHEETS

[75] Inventors: Robert M. Bonaddio, Fresno, Calif.; John R. Dahlberg, Jeannette, Pa.

[73] Assignee: PPG Industries, Inc., Pittsburgh, Pa.

[21] Appl. No.: 169,548

[22] Filed: Jul. 17, 1980

[51] Int. Cl.³ .................. B26F 3/00; B65G 47/26
[52] U.S. Cl. .................... 225/2; 198/458; 198/786; 225/96.5; 83/107; 271/314
[58] Field of Search .......... 198/458, 782, 387, 786, 198/779; 271/248, 250, 314, 299, 272–274; 65/176; 83/102, 107; 225/2, 96.5

[56] References Cited

U.S. PATENT DOCUMENTS

| | | | |
|---|---|---|---|
| 1,810,677 | 6/1931 | Pfeiffer | 83/429 |
| 2,545,667 | 3/1951 | Malnati | 107/22 |
| 2,745,538 | 5/1956 | Lamb | 198/34 |
| 2,801,727 | 8/1957 | Malnati | 198/34 |
| 2,856,060 | 10/1958 | Malnati | 198/34 |
| 3,072,353 | 1/1963 | Moser | 242/56.4 |
| 3,148,761 | 9/1964 | Niederer et al. | 198/458 X |
| 3,161,155 | 12/1964 | Orlandi | 107/4 |
| 3,168,056 | 2/1965 | Engels | 107/9 |
| 3,216,549 | 11/1965 | Niederer et al. | 198/655 X |
| 3,286,815 | 11/1966 | Shuster et al. | 198/34 |
| 3,301,550 | 1/1967 | Reinecke | 198/458 |
| 3,427,910 | 2/1969 | Zempel | 83/107 |
| 3,487,954 | 1/1970 | Pearne et al. | 83/102 X |
| 3,491,634 | 1/1970 | Tomshay | 83/27 |
| 3,809,207 | 5/1974 | Euverard | 198/458 |
| 3,838,803 | 10/1974 | Berry | 225/98 |
| 3,860,232 | 1/1975 | Martin | 271/198 |
| 3,910,402 | 10/1975 | Dean | 198/38 |
| 4,111,412 | 9/1978 | Cathers | 198/782 X |

Primary Examiner—Robert B. Reeves
Assistant Examiner—Paul A. Sobel
Attorney, Agent, or Firm—Donald Carl Lepiane

[57] ABSTRACT

A spacing conveyor section includes a plurality of shafts each having a spring mounted thereon and a plurality of spaced donut rolls mounted on the spring. Glass sections having their leading edges transverse to the sheet movement path and generally aligned with one another are advanced onto the spacing rolls. Thereafter the springs are stretched to increase the distance between sides of adjacent sections. The sections are then advanced along the spacing conveyor section into downstream work positions.

16 Claims, 7 Drawing Figures

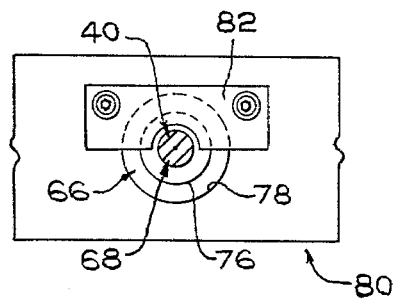
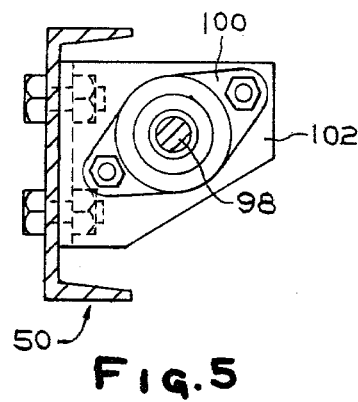
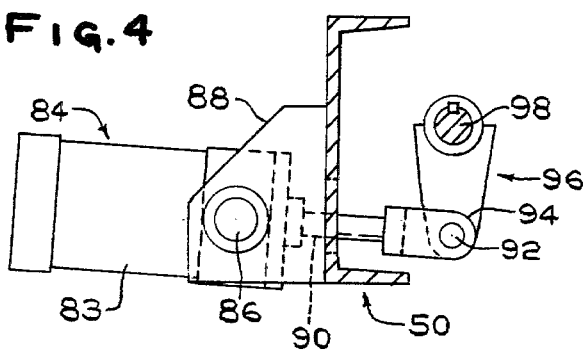
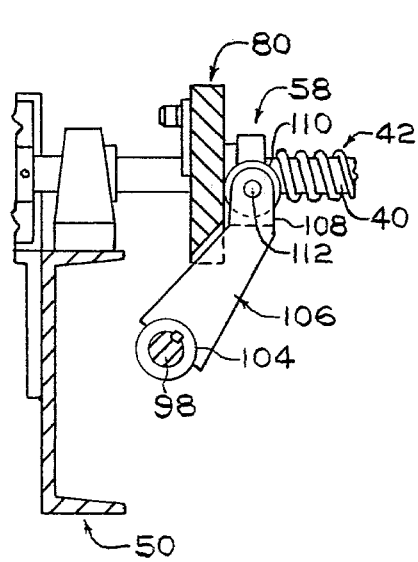
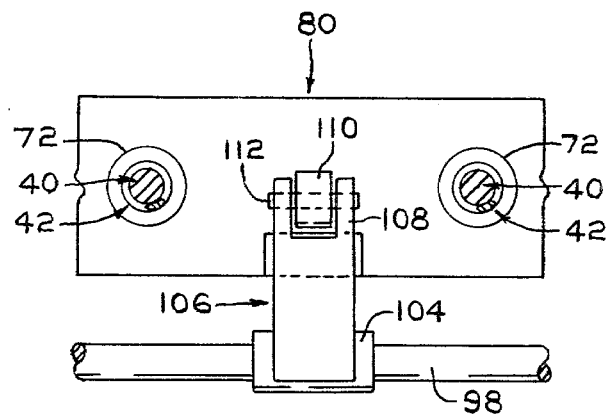

METHOD OF AND APPARATUS FOR SIDEWARD DISPLACEMENT OF SHEETS

BACKGROUND OF THE INVENTION

1. Field of the Invention

This invention relates to a method of and apparatus for spacing sheets and more particularly, to increasing the spacing between sides of adjacent glass sections.

2. Discussion of the Technical Problems of the Present Technology

Glass sheets are severed or cut into pieces by scoring the sheets between their leading and trailing edges and opening the scores. Thereafter, the adjacent opened cut edges of the pieces are separated from one another to prevent edge damage resulting from the edges contacting one another. Various techniques e.g. as taught in U.S. Pat. Nos. 2,545,667; 3,286,815; 3,301,550 and 3,809,207 are available for spacing of adjacent articles.

U.S. Pat. No. 2,545,667, in general, teaches a plurality of springs each having one end connected to a first endless link chain and the other end connected to a second endless link chain. The chains are mounted closer together at one end of a conveyor than at the other end so that the springs stretch as the chains are rotated to space sides of adjacent dough strips. A limitation with the spacing apparatus taught in U.S. Pat. No. 2,545,667 is that changes to alter side spacing of the strips requires repositioning of the link chains.

U.S. Pat. No. 3,286,815, in general, teaches a spacing apparatus for spacing articles which includes a plurality of rods each mounted to and between a pair of spaced endless chains. A plurality of plaques for supporting the articles are slidably mounted for sideward movement on each of the rods. As the rods advance carrying the plaques, depending pins from each plaque contacts upper guiderails which urge the plaques of each rod away from each other to align the plaques with respective ones of spaced conveyor belts at the end of the movement path. The plaques slide toward one another by the depending pin engaging bottom guiderails as the chains continue to rotate. U.S. Pat. No. 3,809,207, in general, teaches a conveyor for converging or diverging a row of sheets. The conveyor has a plurality of rods each having a coiled spring with the rods mounted at their ends to a pair of spaced endless chains. The ends of the springs are connected to a block slidably mounted on the rod. A pin connected to the block rides in one of a pair of spaced guiderails to control the expansion of the spring which in turn controls the spacing of the sheets.

A limitation of the spacing techniques taught in U.S. Pat. Nos. 3,286,815 and 3,809,207 is the need to adjust the guiderails to control or alter the spacing between articles as they move along the path. This adjustment necessitates discontinuing the use of the conveyor and therefore is not normally used for high volume usage.

U.S. Pat. No. 3,301,550, in general, teaches the use of a pair of spaced shafts each having conveyor rollers mounted thereon. A pair of corresponding rolls of each shaft engage a sheet and advance same along a sheet movement path while adjacent corresponding rolls slidably mounted on their respective shaft moves an adjacent sheet in forward and sideward directions to space the adjacent sheets. A limitation of the apparatus in U.S. Pat. No. 3,301,550 is that the sheet is engaged at opposed surfaces. The technique of engaging a sheet between rollers is not normally recommended when the sheet surfaces can be scuffed and sheets of various thickness are to be spaced.

In view of the above, it would be advantageous to provide a technique for altering the spaced distance between sides of adjacent sheets, for example, glass sheets, that does not have the limitations of the presently available spacing techniques.

SUMMARY OF THE INVENTION

This invention relates to a conveyor section for spacing side edges of adjacent articles, e.g. glass sheet. The section includes a plurality of spacing and conveying rolls each having a linearly expandable and torque transmitting member, e.g. a tension spring mounted on a shaft. Facilities slidably mounted on the shaft expand the spring to space the articles. Drive facilities act on either the spring or the shaft to rotate same around the longitudinal axis of the shaft to advance the articles.

Further, this invention relates to a method of altering the spacing between sides of adjacent articles having aligned leading edge portions as they advance along a movement path. The method includes the step of providing a plurality of shafts each having the tension spring mounted thereon and facilities slidably mounted on each shaft for controlling the extension of the spring to space the articles. At least one of the springs is rotated around the longitudinal axis of its respective shaft to advance the articles along the movement path. Selected ones of the controlling facilities are acted on to alter the spacing between edge portions of adjacent articles. More particularly, the springs are expanded to increase the spacing between sides of adjacent sheets or the spring is allowed to compress under its own biasing force to decrease the spacing between sides of adjacent sheets.

The instant invention eliminates the limitations of the presently available techniques by, among other things, rotating a coiled spring and/or shaft about the longitudinal axis of the shaft. The spring expanding facilities for altering the spacing of the sheets are slidably mounted on each shaft. With this arrangement, the spacing between sides of adjacent sheets is conveniently altered by sliding the expanding facilities on each of the shafts relative to one another. Unlike the presently available spacing conveyors, the sheets are not engaged by upper and lower rolls nor is it necessary to adjust guiderails to alter the spacing between adjacent sheets.

BRIEF DESCRIPTION OF THE DRAWING

FIG. 3 is a view taken along lines 3—3 of FIG. 2;

FIG. 4 is a view taken along lines 4—4 of FIG. 1;

FIG. 5 is a view taken along lines 5—5 of FIG. 1;

FIG. 6 is a view taken along lines 6—6 of FIG. 1; and

FIG. 7 is a view taken along lines 7—7 of FIG. 1.

DESCRIPTION OF THE INVENTION

Figure 1:
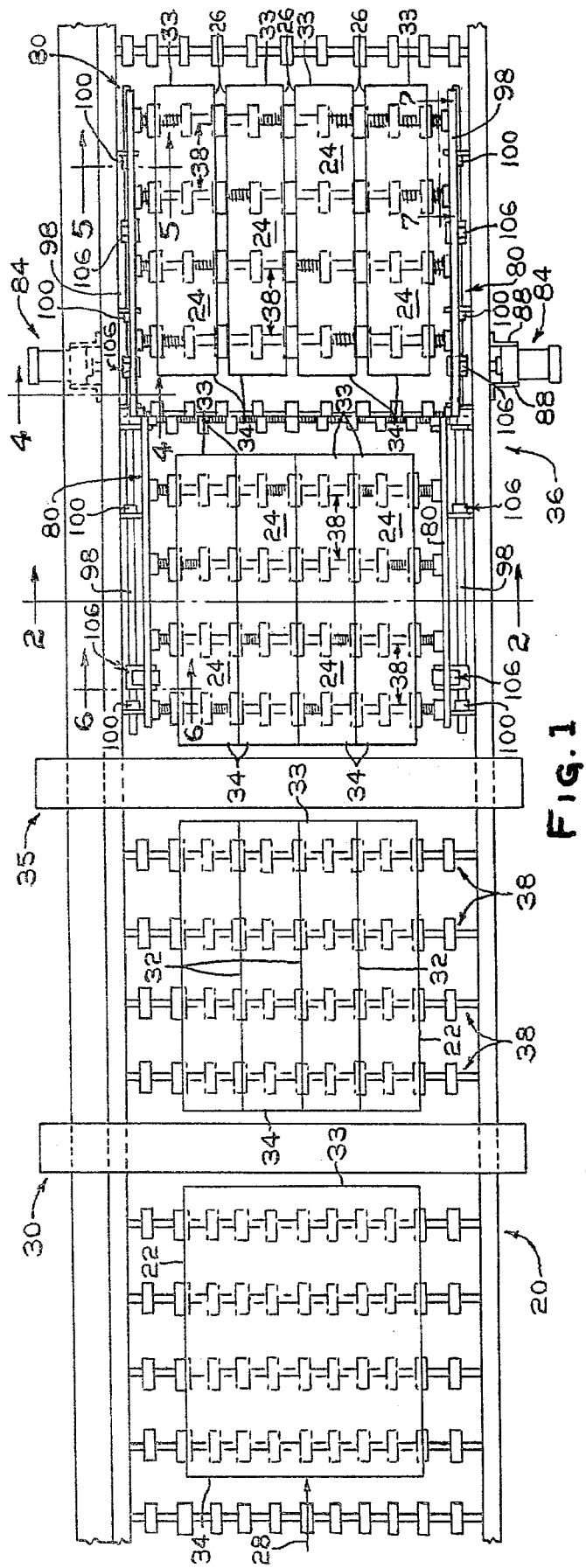
FIG. 1 is a plan view of a conveyor system having a spacing section incorporating features of the invention for spacing side edges of adjacent glass pieces.

Shown in FIG. 1 is a conveying system 20 for severing glass sheet 22 into glass sections or pieces 24 and spacing side edges 26 from one another. In general, the sheet 22 conveniently advances in the direction of the arrow 28 through a scoring station 30 to impose longitudinal scores 32 in the glass sheet, i.e. score lines between leading and trailing edges 33 and 34 respectively of the advancing glass sheet. The invention is not limited to the scoring station 30 and any convenient scoring station e.g of the type taught in U.S. Pat. Nos. 4,096,773; 4,137,803 and/or 4,016,969 may be used in the practice of the invention. The scored glass sheet 22 advances downstream through a score opening position 35 to open the longitudinal scores 32 to sever the glass sheet 22 into the glass pieces 24. Thereafter the glass pieces 24 advance onto spacing conveyor section 36 incorporating features of the invention. The score opening position 35 is not limiting to the invention and may be of the type taught in U.S. Pat. No. 4,109,841 which teachings are hereby incorporated by reference.

Figure 2:
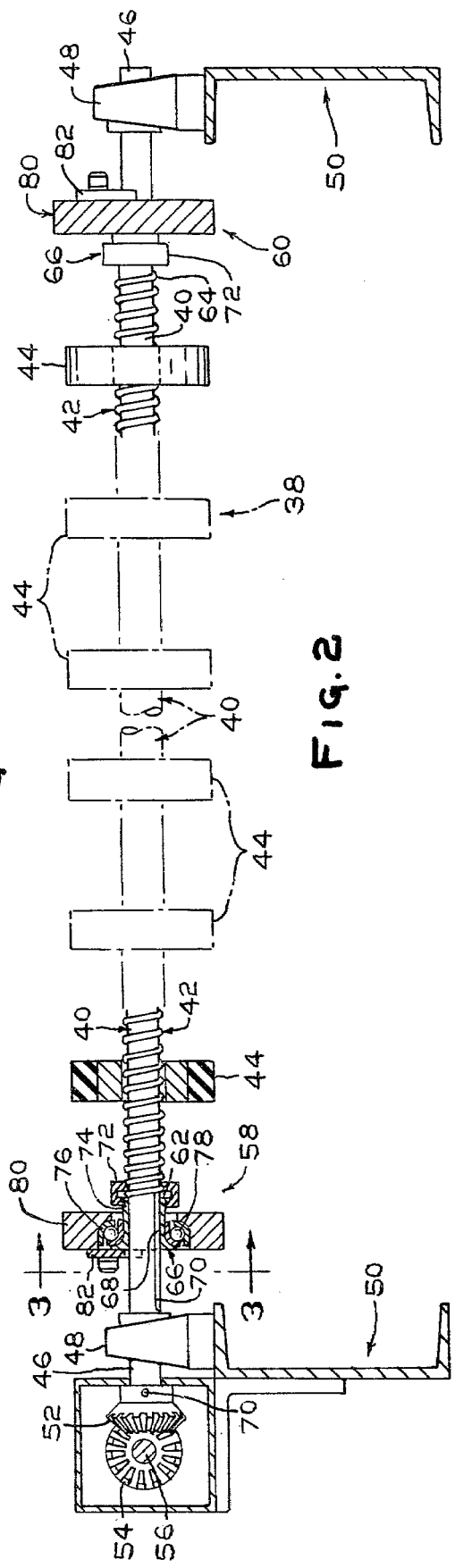
FIG. 2 is a view taken along lines 2—2 of FIG. 1 and having portions removed for purposes of clarity.

The discussion will now be directed to the spacing conveyor section 36 incorporating features of the invention for spacing side edges 26 of adjacent glass pieces 24. Referring now to FIGS. 1 and 2, the conveyor section 36 includes a plurality of spacing rolls 38 which are similar in construction and each include a shaft 40 having a linearly expandable and preferably also torque transmitting member 42 e.g. tension spring 42 conveniently mounted thereon and a plurality of donut rolls 44 frictionally mounted on the spring 42. Each of the opposed ends 46 of the shaft 40 is mounted in a pillow block bearing 48 which in turn is conveniently mounted on conveyor superstructure 50. One of the shaft ends 46 (the left shaft end as viewed in FIG. 2) is conveniently powered for example, by a miter gear 52 mounted on the shaft end 46 meshing with miter gear 54 mounted on motor driven shaft 56.

The tension spring 42 is mounted for compression and elongation and preferably also rotation in any convenient manner for example by spaced spreader devices 58 and 60 mounted on the shaft 40 and engaging adjacent end 62 and 64, respectively, of the spring 42. Each of the spreader devices 58 and 60 include a cone shaped race collar 66 slidably mounted on the shaft 40 and locked to rotate with the shaft 40 by key 68 on the inner wall of the race collar 66 slidable in groove 70 preferably extending from the adjacent shaft end 46 toward the center of the shaft (a portion of the groove 70 only shown in the left end 46 of the shaft 40 as shown in FIG. 2). The spring end 62 and 64 is secured to the adjacent spreader device 58 and 60, respectively, by a cap 72 which engages the adjacent spring end 62 or 64 and is conveniently secured on the collar end 74. A sealed bearing assembly 76 is mounted on the race collar 66 and secured in position by mounting the race collar 66 and bearing assembly 76 in a stepped hole 78 formed in pusher bar 80. With reference to FIG. 3 a keeper plate 82 conveniently mounted on the pusher bar 80 maintains the collar 66 and bearing 76 in position. With the above arrangement, as the shaft 40 is rotated by the miter gears 52 and 54 the spreader devices 58 and 60, spring 42 and wheels 44 rotate to advance the glass sections 24 along the movement path. As can be appreciated, the invention may be practiced by powering only selective ones of the shafts to advance the glass sections. The remaining rolls 38 may have freely rotating shafts 40 which are rotated by the movement of the sections 24 along the movement path.

The pusher bars 80 may be moved away from each other to elongate the tension spring 42 to space edges 26 of the adjacent sections 24 in any convenient manner. For example, and with reference to the FIGS. as designated, cylinder 83 of a cylinder assembly 84 is conveniently mounted at opposite sides of the spacing section 36 as shown in FIG. 1 in a manner as shown in FIG. 4. With continued reference to FIG. 4, the cylinder 83 is trunion mounted at 86 to plates 88 (one only shown in FIG. 4) conveniently secured to the super structure 50 of the conveyor with piston 90 of the cylinder assembly 84 pivotally mounted at 92 to end 94 of crank arm 96. The opposite end of the crank arm 96 is conveniently secured to elongated shaft 98. As shown in FIGS. 1 and 5 and with specific reference to FIG. 5, the elongated shaft 98 is aligned with the pusher bar 82 as shown in FIG. 1 by mounting the elongated shaft 98 in spaced flange bearing 100 each mounted to a plate 102 secured to the super structure 50 in any convenient manner.

Referring to FIGS. 1, 6 and 7, and with specific reference to FIGS. 6 and 7, end 104 of spaced crank arms 106 secured to its respective elongated shaft 98 has a bifurcated end 108 for securing a push arm roller 110 therebetween on axel 112 as shown in FIG. 7. With the above arrangement energizing the cylinder assembly 84 moves the piston 90 out of the cylinder 83 to rotate the crank arm 96 in an counter clockwise direction which rotates the elongated shaft 98 in a counterclockwise direction as viewed in FIGS. 4 and 6. The elongated shaft 98 as it rotates, rotates the crank arm 106 in a counterclockwise direction to move the pusher bar 80 away from the center of the spacing conveyor section 36, i.e. the pusher bars 80 move away from each other to stretch or elongate the tension springs 42 by way of the spreader devices 58 and 60. Elongation of the springs 42 spaces the wheels 44 thereon to space sides 26 of the adjacent sections 24. When the piston 90 is pulled into the cylinder 83 the crank 96, elongated shaft 98, crank 106 each rotate in a clockwise direction as viewed in FIGS. 4 and 6 to disengage the pusher bars 80. The pusher bars 80 move toward the center of the conveyor, i.e. toward one another by the biasing action of the tension spring acting 42 on the collars 58 and 60. As the spring 42 compresses, the spacing between the wheels 44 decreases and the spacing between edges 26 of adjacent sections 24 decreases As can now be appreciated, the invention is not limited to the use of a tension spring mounted on the shaft and any member having linear expandability or elasticity to space adjacent edges of the articles may be used. Preferably the member is also capable of transmitting torque to rotate the donut rolls to advance the articles. For example, a rubber sleeve may be used in the practice of the invention.

Although the discussion has been directed to spacing glass sections, sheets of any type of material, for example, metal sheets, plastic sheets, refractory sheets e.g. glass ceramic, ceramic may be separated in accordance with the teachings of the invention. Still further, the invention contemplates separating packages or food stuffs and is not limited to the configuration or article to be spaced.

BRIEF DESCRIPTION OF THE INVENTION

A glass sheet having a thickness of about 0.120 inch (0.30 centimeter), a length of about 3 feet (0.9 meters) as measured between the leading edge 33 and trailing edge 34 of the advancing sheet 22 and a width of about 4 feet (1.2 meters) is conveniently advanced through scoring station 30 to impose longitudinal scores 32 in the glass sheet 22 each on a center to center spacing of about 1 foot (0.3 meters). The scored glass sheet 22 is advanced through score opening station 35 to open the scores 32 to provide four glass sections 24 each having a width of about 1 foot (0.3 meters) and a length of about 3 feet (0.9 meters) and their leading edge 33 generally aligned with one another and transverse to the movement path 28. After the sheet moves through the score opening station 35, the shafts 40 of the spacing and conveying rolls 38 at the spacing section 36 are rotated by drive shaft 56 as discussed above to advance the glass sections 24 onto the spacing section 36. After the glass sections 24 are in the spacing section 36, the cylinder assembly 84 at each side of the spacing section is energized to move the pusher bars 80 away from each other a distance of about 4 inches (10.16 centimeters). In other words, each pusher bar 80 is moved about 2 inches (5.08 centimeters) from the centerline of the sheet movement path. With about 2 inches (5.08 centimeters) displacement of the pusher bars 80 and assuming that the spring 42 is extended from a length of about 56 inches (1.4 meters) to a length of about 60 inches (1.5 meters) a spaced distance of about 0.85 inches (2.16 centimeters) between adjacent sheet edges 26 is provided. After the sections 24 have their side edges 26 spaced from one another, the drive shaft 56 is energized to rotate spacing and conveying rolls 38 as previously discussed to advance the spaced sections 24 along the spacing section 36 for further processing. For example, the glass sections 24 may be further cut and/or loaded for storage or shipment.

The invention may be practiced by energizing the cylinder assembly at one side of the conveyor to space the side edges 26 of adjacent sections 24 from one another. In the above example, the spacing between side edges of the sheets is about 0.42 inch (1.08 centimeter) when only one cylinder assembly is energized. Still further, the invention may be practiced by either energizing both cylinder assemblies 84 or one cylinder assembly 84 as the sections 26 advance along the sheet movement path. With this arrangement, as the sections advance in the direction of the arrow 28 the cylinder assemblies 84 are energized to incrementally move the piston 90 out cylinder 83 to incrementally increase the spaced distance between side edges 26 as the sections 24 move along conveyor section 36.

As can now be appreciated, the invention is not limited to the above examples which were presented for illustration purposes only. For example, the invention may be practiced for increasing the distance between side edges 26 as was discussed above or in the alternative decreasing the distance between side edges 26.

What is claimed is:

1. A conveyor having a section for spacing edge portions of adjacent articles, comprising:
    a plurality of spacing rolls, each of said spacing rolls comprising:
    a shaft;
    a member having linear elasticity and torque transmission mounted on said shaft; and
    means slidably mounted on said shaft and engaging said member for expanding said member said expanding means includes a collar slidably mounted on said shaft adjacent each shaft end,
    each of said collars engaging adjacent end of said member and means for securing said collars to their respective shaft to rotate said collars with said shaft; and
    means for rotating at least one of said rolls about longitudinal axis of its shaft.

2. The conveyor as set forth in claim 1 wherein said securing means includes:
    a tab mounted on the innerwall of said collar and slidably mounted in a groove formed in the shaft.

3. The conveyor as set forth in claim 2 wherein said rotating means rotates said shaft to advance the articles along a movement path.

4. A conveyor having a section for altering spacing between edge portions of adjacent articles, comprising:
    a plurality of spacing rolls each comprising:
    a shaft;
    a member having linear elasticity and torque transmission mounted on said shaft; and
    means slidably mounted on said shaft and engaging said member for expanding said member;
    means for rotating at least one of said shafts to rotate its respective member and shaft around longitudinal axis of the shaft to advance the articles to be spaced along a movement path; and
    means mounted along at least one side of the movement path for movement along a reciprocating path generally transverse to the movement path for acting on said expanding means to move said member by way of said expanding means in a first direction and to move said member in an opposite second direction by way of linear elasticity of said member.

5. A conveyor having a section for spacing edge portions of adjacent articles, comprising:
    a plurality of spacing rolls, each of said spacing rolls comprising:
    a shaft;
    a member having linear elasticity and torque transmission mounted on said shaft; and
    means slidably mounted on said shaft and engaging said member for expanding said member wherein said expanding means includes:
    a collar mounted on said shaft;
    a pusher bar;
    a bearing mounted on said collar; and
    means for mounting said collar and said bearing of each shaft to said pusher bar; and
    means for rotating at least one of said rolls about longitudinal axis of its shaft.

6. The conveyor as set forth in claim 5 further including a cylinder assembly and linkage assembly for displacing said pusher bar away from the center of the conveyor and for releasing said pusher bar to move said pusher bar toward the center of the conveyor under the biasing action of said spring.

7. The conveyor as set forth in claim 1 or 5 or 4 wherein the article is a sheet of refractory material and further including a scoring station for scoring the sheet, a score opening station for opening the score imposed in the sheet and means for advancing the sheet through the scoring station, the score opening station and onto said spacing rolls for subsequent spacing of side edges of adjacent sections cut from the sheet.

8. The conveyor as set forth in claim 1 or 5 or 4 wherein said member is a tension spring.

9. The conveyor as set forth in claim 8 further including spaced donut rolls mounted on said tension spring.

10. A method of altering side spacing between adjacent articles as they advance along a movement path, comprising the steps of:
    providing a plurality of shafts each having a member having linear elasticity and torque transmission mounted thereon and means including a collar slidably mounted on each shaft and engaging the member for expanding the member, the shafts mounted to prevent linear displacement of the shafts relative to the movement path;

rotating at least one of the shafts about its longitudinal axis to rotate its respective member through its respective collar around the longitudinal axis of its respective shaft to advance the articles along the movement path; and sliding the collar of selected shafts along its respective shaft to act on the member to alter the spacing between edge portions of adjacent articles.

11. The method as set forth in claim 10, wherein said acting step is practiced as the articles advance along the movement path.

12. The method as set forth in claim 10 further including the step of stopping the sheets prior to practicing said acting step.

13. The method as set forth in claim 10 wherein said acting step is practiced at one side of the conveyor.

14. The method as set forth in claim 10 wherein the acting step is practiced to increase the distance between adjacent articles.

15. The method as set forth in claim 10 wherein the acting step is practiced to decrease the distance between adjacent articles.

16. The method as set forth in claim 14 or 15 wherein the article is a sheet of refractory material and further including the steps of:

severing the sheet of refractory material into sections having their leading edges transverse to the movement path; and practicing said providing step, rotating step and acting step to alter the spacing between side edges of adjacent sections.

* * * * *